United States Patent
Uchil et al.

(10) Patent No.: US 8,181,010 B1
(45) Date of Patent: May 15, 2012

(54) DISTRIBUTED AUTHENTICATION USER INTERFACE SYSTEM

(75) Inventors: Mrudul P. Uchil, San Jose, CA (US); Aravindan Ranganathan, San Jose, CA (US)

(73) Assignee: Oracle America, Inc., Redwood City, CA (US)

( * ) Notice: Subject to any disclaimer, the term of this patent is extended or adjusted under 35 U.S.C. 154(b) by 1017 days.

(21) Appl. No.: 11/379,008

(22) Filed: Apr. 17, 2006

(51) Int. Cl.
*G06F 21/00* (2006.01)

(52) U.S. Cl. ........... 713/152; 713/159; 726/2; 380/278; 709/203; 711/118

(58) Field of Classification Search .................. 726/2, 3; 713/170
See application file for complete search history.

(56) References Cited

U.S. PATENT DOCUMENTS

| | | | |
|---|---|---|---|
| 6,324,648 B1 * | 11/2001 | Grantges, Jr. ................ | 726/12 |
| 6,463,474 B1 * | 10/2002 | Fuh et al. ..................... | 709/225 |
| 6,598,167 B2 * | 7/2003 | Devine et al. ................. | 726/8 |
| 6,662,228 B1 * | 12/2003 | Limsico ........................ | 709/225 |
| 6,678,731 B1 * | 1/2004 | Howard et al. ............... | 709/225 |
| 6,985,946 B1 * | 1/2006 | Vasandani et al. ........... | 709/225 |
| 7,114,083 B2 * | 9/2006 | Devine et al. ................. | 713/152 |
| 7,296,292 B2 * | 11/2007 | Chang et al. .................. | 726/13 |
| 7,428,523 B2 * | 9/2008 | Tsang et al. ................... | 707/2 |
| 7,437,732 B1 * | 10/2008 | Boydstun et al. ............. | 719/313 |
| 2001/0044893 A1 * | 11/2001 | Skemer ......................... | 713/153 |
| 2002/0184444 A1 * | 12/2002 | Shandony ..................... | 711/118 |
| 2004/0039797 A1 * | 2/2004 | Simpson et al. .............. | 709/219 |
| 2004/0128547 A1 * | 7/2004 | Laidlaw et al. ............... | 713/201 |
| 2004/0210771 A1 * | 10/2004 | Wood et al. ................... | 713/201 |
| 2004/0230797 A1 * | 11/2004 | Ofek et al. .................... | 713/168 |
| 2006/0095779 A9 * | 5/2006 | Bhat et al. ..................... | 713/182 |
| 2006/0236382 A1 * | 10/2006 | Hinton et al. ................. | 726/8 |
| 2007/0022289 A1 * | 1/2007 | Alt et al. ........................ | 713/168 |
| 2007/0174627 A1 * | 7/2007 | Teijido et al. ................. | 713/182 |

OTHER PUBLICATIONS

Kouadri et al, A Generic Framework for Context-Based Distributed Authorizations, Springer Berlin / Heidelberg, 2003, vol. 2680/2003.*

* cited by examiner

*Primary Examiner* — Taghi Arani
*Assistant Examiner* — Morshed Mehedi
(74) *Attorney, Agent, or Firm* — Martine Penilla Group, LLP

(57) ABSTRACT

A system for authenticating a request to access a protected network resource behind two security layers is disclosed. The system includes a client which contains a web browser, a first server tier, and second server tier. The first server tier is protected behind a first security layer and hosts a first software object and second software object. The first server tier is operatively coupled to the client system via a first connection wherein the first software object and second software object are configured to be in communications with the web browser. The second server tier is protected behind the first security layer and second security layer and hosts an authentication service. The second server tier is operatively coupled to the first server tier via a second connection wherein the authentication service is configured to be in communications with the second software object.

20 Claims, 5 Drawing Sheets

DISTRIBUTED AUTHENTICATION USER INTERFACE SYSTEM

BACKGROUND

The advent of the Internet (i.e., World Wide Web) has opened up an entirely new paradigm for companies and individuals to conduct business and share information. A to key concern that arises during these transactions is security. Whenever a computer system (i.e., client or server) establishes network access to the Internet, the computer system itself becomes vulnerable to unauthorized or malicious Internet users gaining access to sensitive information or permission to perform malicious actions on the computer system.

Authentication is the process by which a computer system ensures that users who access information or perform a function on the computer system are in fact who they say they are and are authorized to do so. Currently, user authentication services for client/server systems can follow either completely centralized model or completely decentralized model.

A centralized user authentication system typically includes an application server hosting a web agent/application installed in a demilitarized zone (DMZ) established between a first and second firewall layer and an authentication server hosting an authentication service installed behind both the first and second firewall layers. In this model, a client (i.e., Internet web browser) seeking to access a resource protected by the authentication server would initially contact the web agent/application on the application server and then send authentication information (e.g., personal identification number, password, biometrics data, etc.) directly to the authentication server across two layers of firewalls. This practice is disapproved by many network security administrators because it compromises the security of the authentication service itself by exposing it to manipulation by malicious clients.

In a decentralized user authentication system, an application server hosting a web agent/application would typically be installed behind a firewall. The web agent/application itself would perform all the authentication functions of the authentication service without the need for a separate authentication server. Using this model, a client trying to access a resource protected by the web agent/application would communicate directly with the web agent/application. The limitation with this model is that it is difficult to standardize the display presentations across all web agent/application platforms and therefore can be cumbersome and expensive to maintain and support.

In view of the forgoing, a user authentication module is needed which can arbitrate authentication transactions between a client and an authentication service across multiple firewall layers enabling the authentication service to be maintained on a centralized server.

SUMMARY

Broadly speaking, the present invention fills these needs by providing methods and systems for arbitrating authentication transactions between a client and an authentication service across multiple firewall layers enabling the authentication service to be maintained on a centralized server. It should be appreciated that the present invention can be implemented in numerous ways, including as a system, a method and a computer program. Several inventive embodiments of the present invention are described below.

In one embodiment, a method for authenticating a request to access a protected network resource is disclosed. A first software object receives a request from a web browser. The request is re-directed to a distributed software object that is protected behind a first security layer. The distributed software object then communicates the request across a second security layer to an authentication service. The request asks for input from the authentication service specifying a required authentication solution. The authentication service sends the required authentication solution to the distributed software object which arbitrates an authentication transaction sequence between the web browser and the authentication service.

In another embodiment, a system for authenticating a request to access a protected network resource behind two security layers is disclosed. The system includes an authentication server that hosts a first software object and second software object. The first software object and second software object being protected behind a first security layer. The first software object includes a web agent that resides within a first web container and is configured to communicate with the second software object. The second software object includes a distributed authentication module residing within a second web container and configured to arbitrate authentication transactions between a web browser and an authentication service. The authentication service resides behind a second security layer and the web browser resides outside both the first and second security layers.

In still another embodiment, a system for authenticating a request to access a protected network resource behind two security layers is disclosed. The system includes a client which contains a web browser, a first server tier and second server tier. The first server tier is protected behind a first security layer and hosts a first software object and second software object. The first server tier is operatively coupled to the client system via a first connection wherein the first software object and second software object are configured to be in communications with the web browser. The second server tier is protected behind the first security layer and second security layer and hosts an authentication service. The second server tier is operatively coupled to the first server tier via a second connection wherein the authentication service is configured to be in communications with the second software object.

BRIEF DESCRIPTION OF THE DRAWINGS

The present invention will be readily understood by the following detailed description in conjunction with the accompanying drawings, and like reference numerals designate like structural elements.

DETAILED DESCRIPTION

Figure 1A:
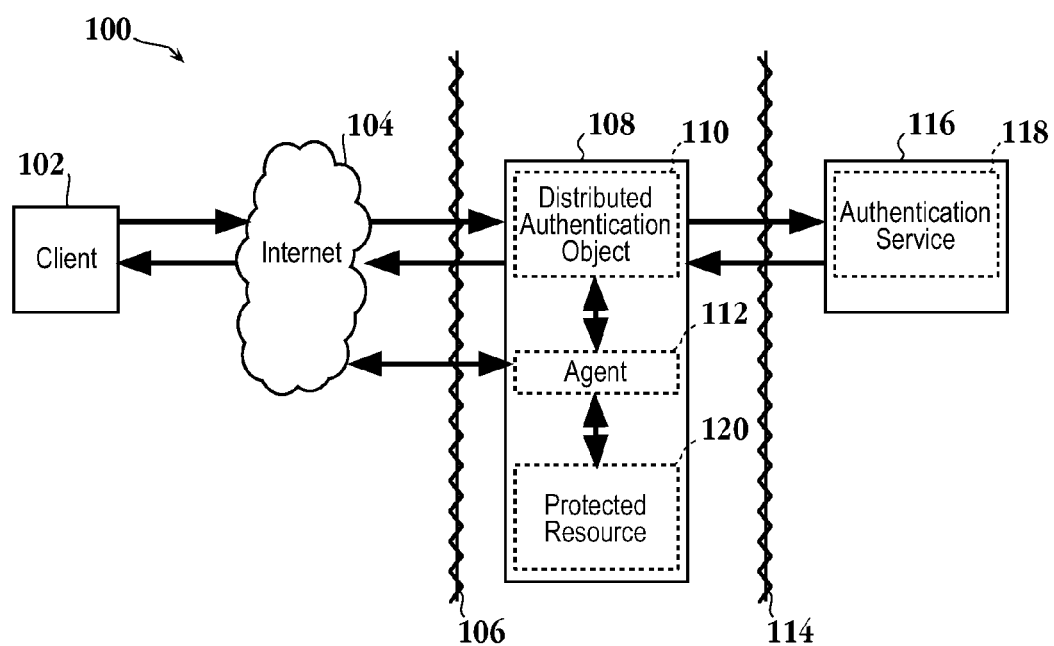
FIG. 1A is an illustration of a system for authenticating a request to access a protected network resource, in accordance with one exemplary embodiment of the present invention.

An invention is described for methods and systems for methods and systems for arbitrating authentication transactions between a client and an authentication service across multiple firewall layers enabling the authentication service to be maintained on a centralized server. It will be obvious, however, to one skilled in the art, that the present invention may be practiced without some or all of these specific details. In other instances, well known process operations have not been described in detail in order not to unnecessarily obscure the present invention.

The fundamental focus of network security systems is to address the problem of access control. Mainly, ensuring that a protected network resource (e.g., server, database, personal computer system, application, etc.) is not accessed by individuals or entities that are not authorized to do so. The range of applications for network security systems spans far and wide from controlling access to account information on Internet banking sites, authorizing specified users to withdraw cash from individual bank accounts using automatic teller machines (ATM) at a grocery checkout stand, to managing user rights to access sensitive information on a database server. In the most basic configuration, a network security system includes an authentication service that resides on a computer system (i.e., authentication server, etc.) that is configured to intercept all requests to access a protected network resource. The requests can originate from clients either dispersed within a protected local area network (LAN) or on a wide area network (WAN) such as the Internet. Usually, the computer system is placed behind one or more security layers (i.e., firewalls) that prevent unauthorized users from maliciously compromising the security of the system.

As used herein, a firewall is any software package or hardware device that protects networked computers from intentional hostile intrusion that could compromise confidentiality or result in data corruption or denial of service. A network firewall typically sits at the junction point or gateway between the two networks, usually a private network (i.e., company Intranet, local LAN, etc.) and a public network such as the Internet. Depending on the configuration, firewalls can be hosted on the same computer system as a protected resource or on a separate system.

A demilitarized zone (DMZ) is a computer or sub-network that sits between a trusted internal network, such as a private LAN, and an untrusted external network, such as the Internet. Typically, the DMZ contains devices (i.e., computers, servers, etc.) that are accessible to external network Internet traffic, such as Web application servers, file transfer protocol (FTP) servers, simple mail transfer protocol (SMTP) servers and domain name system (DNS) servers. Devices inside the DMZ zone may be configured to access certain servers within an internal network such as database or authentication servers.

Authentication of a client attempting to access a protected network resource can be achieved using a variety of methods including matching information about some distinguishing characteristics of the client (e.g., biometric information, device configuration, etc.), confirming something that only the client possesses (e.g., Smartcard, ID card, security token, software token, etc.), verifying something that only the client knows (e.g., a password, a pass phrase, personal identification number, keystroke sequence, etc.), or some combination of the three.

What is disclosed by the embodiments described herein is essentially a distributed authentication user interface system to arbitrate authentication transactions between a client and an authentication service across multiple firewall layers.

FIG. 1A is an illustration of a system for authenticating a request to access a protected network resource, in accordance with one exemplary embodiment of the present invention. As depicted in this embodiment, the system 100 includes a client 102 that is functionally connected to an authentication server 108 that is protected behind a first security layer 106 by way of the Internet 104. The authentication server 108 is configured to be in communication with an identity server 116 and hosts a distributed authentication object 110, a web agent 112, and a protected network resource 120. The identity server 116 hosts an authentication service 118 that is protected behind a second security layer 114.

In one embodiment, the distributed authentication object 110 is configured to operate in conjunction with the web agent 112 during authentication transactions involving the client 102, authentication service 118, and protected network resource 120. The web agent 112 is configured to be in communications with the client 102, distributed authentication object 110, and the protected network resource 120. In one embodiment, the web agent intercepts all requests from the client 102 to access the protected network resource 120. The web agent 112 allows authorized clients 102 (i.e., clients submitting requests containing the proper authentication token) to access the protected network resource 120 immediately without further authentication and re-directs unauthorized clients 102 (i.e., clients submitting requests not containing the proper authentication token) to the distributed authentication object 110 which arbitrates further authentication transactions between the client 102 and authentication service 118. In one embodiment, the client 102 is a web browser application that can be utilized by a user to access a protected network resource 120 via the Internet 104. However, it should be understood that the client 102 can be any application or hardware device so as long as it can operatively interface with the authentication server 108. In one embodiment, the protected network resource 120 is hosted on a separate storage device (e.g., database server, application server, web server, etc.) from the web agent 112.

In one embodiment, the distributed authentication object 110 is a software application that is included as part of an overall integrated web application framework software package such as JAVA™ 2 Platform Enterprise Edition (J2EE™), WEBOBJECTS™, or APACHE COCOON™. It should be understood, that the distributed authentication object 110 can be packaged with essentially any web application framework software package so long as the package can be configured to manage authentication transactions for client-server systems. In another embodiment, the distributed authentication object 110 is a standalone software application that is configured to be used as a functionality upgrade to existing web application framework software packages.

Still with FIG. 1A, in one embodiment, the distributed authentication object 110 and the web agent 112 are written in JAVA™. It should be appreciated that the distributed authentication object 110 and web agent 112 can be created using any number of programming languages including hypertext preprocessor (PHP), Practical Extraction and Report Language (PERL), JAVASCRIPT™, Extensible Markup Language (XML), PYTHON™, or RUBY™. However, one skilled in the art will know that essentially any programming language can be used to create a distributed authentication object 110 or web agent 112 so long as the language can effectuate the required authentication functions of those software objects. In one embodiment, the distributed authentication object 110 and web agent 112 are both deployed in web containers that are servlet compliant. The web containers are configured to facilitate the interactions between the software objects (i.e., distributed authentication object 110 and web agent 112) and a client web browser interacting with the objects through the Internet 104.

In one embodiment, both the first security layer 106 and the second security layer 114 are software-based firewalls (i.e., firewall created using a software package) that are configured to examine and restrict certain classes of communications traffic between devices (i.e., authentication server 108 and identity server 116) that are protect behind them. In another embodiment, both the first security layer 106 and second security layer 114 are device-based firewalls (i.e., firewall created using a hardware device such as a TCP/IP router) configured to do the same. It should be understood, that the two security layers (i.e., the first security layer 106 and the second security layer 108) can be made up of any combination of software-based or device-based firewalls so long as the resulting security layers can operatively function to allow authorized communications with the devices (e.g., authentication server 108, identity server 116, external protected network resource, etc.) that they protect.

Continuing with FIG. 1A, in one embodiment, the gap between the first security layer 106 and the second security layer 114 is referred to as a demilitarized zone for the system. 100. In another embodiment, the demilitarized zone is behind two or more security layers. It should be understood, that the demilitarized zone can be established behind any security layer so long as it does not reside in the same space (i.e., server layer) as the identity server 116. In one embodiment, the authentication server 108 resides within the demilitarized zone of the system 100 and is configured to transact communications with both the clients 102 connected through the Internet and the identity server 116 residing behind one or more security layers. It should be appreciated that the authentication server 108 can reside behind any security layer so long as it does not reside in the same space as the identity server 116.

In one embodiment, the authentication server 108 communicates with the identity server 116 via a communications backchannel. In one embodiment, the backchannel is configured to allow only communication transactions between the authentication server 108 and the identity server 116 and not direct communications with devices or entities external to the authentication server 108. For example, the backchannel will not allow a client 102 on the Internet 104 to directly communicate with the identity server 116 using the authentication server 108 as a communications channeling device. Rather, the backchannel will only allow communications traffic originating from the authentication server 108.

Further describing FIG. 1A, in one embodiment, the authentication service 118 is created using JAVA™ programming language. However, it should be appreciated that the authentication service 118 can be created using any programming language (e.g., C, C++, Visual Basic, etc.) so long as the language can impart the necessary authentication functionalities to the authentication service 118.

Figure 1B:
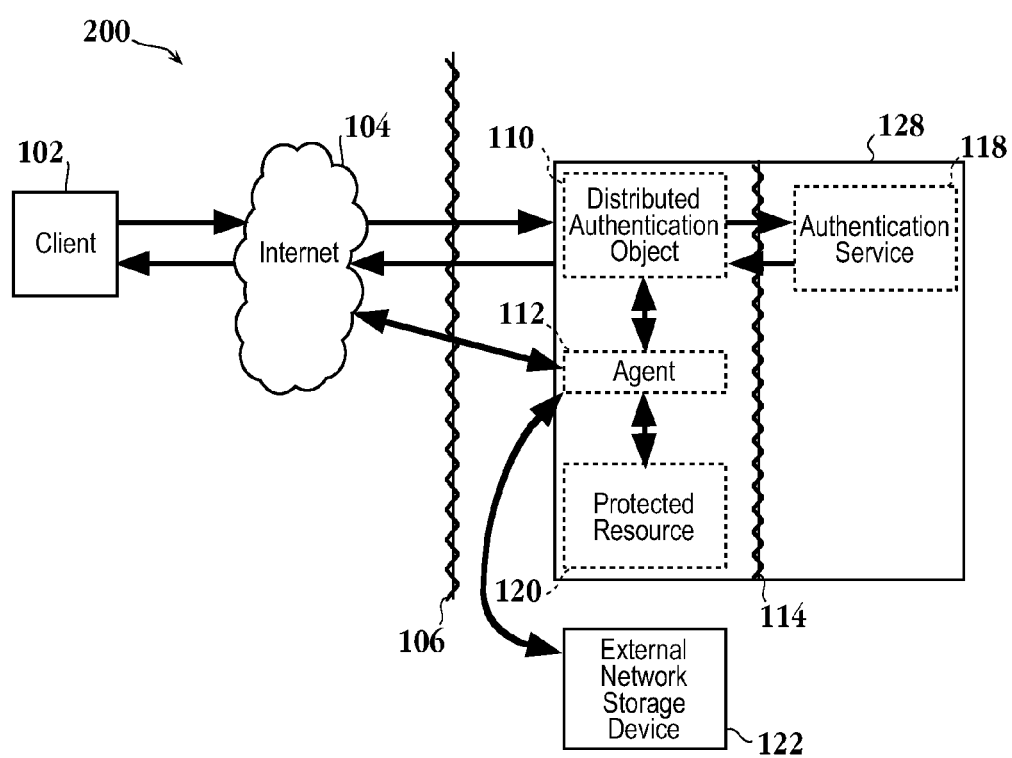
FIG. 1B shows an illustration of a system for authenticating a request to access a protected network resource, in accordance with one embodiment of the present invention.

FIG. 1B shows an illustration of a system for authenticating a request to access a protected network resource, in accordance with one embodiment of the present invention. In this embodiment, the system 200 includes a client 102 that is functionally connected via the Internet 104 to an identity server 128 that hosts a distributed authentication object 110, a web agent 112, an authentication service 118, and a protected network resource 120. The identity server 128 is configured to allow the client 102 to communicate with the distributed authentication object 110, the web agent 112 and the protected network resource 120. The distributed authentication object 110 and web agent 112 residing within a DMZ that is protected behind a first security layer 106 and configured to be in communication with clients 102 via the Internet 104. Additionally, the distributed authentication object 110 is configured to be in communication with the authentication service 118 protected behind a second security layer 114 via a communications backchannel. The distributed authentication object 110 is configured to operate in conjunction with the web agent 112 during authentication transactions involving the client 102, the authentication service 118 and the protected network resource 120 in the same manner as discussed above. As described above, the first security layer 106 and the second security layer 114 may be software based or device based firewalls.

Continuing with FIG. 1B, in one embodiment, the protected network resource 120 resides in an external network storage device 122 that is separate from the identity server 128. The external protected network storage device 122 is configured to communicate with the web agent 112 via a communications link with the identity server 128.

Figure 2:
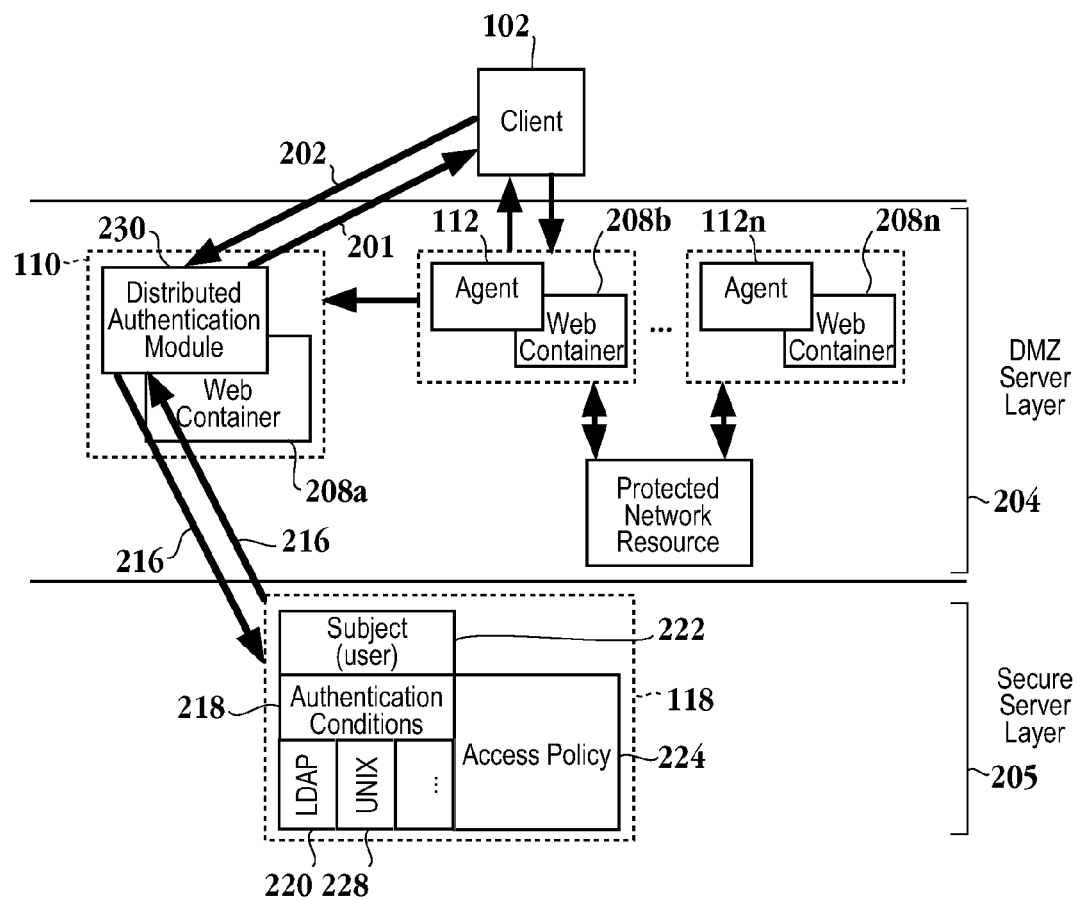
FIG. 2 is a detailed illustration depicting how the distributed authentication object arbitrates authentication transactions involving a client, web agent, and authentication service, in accordance with one exemplary embodiment of the present invention.

FIG. 2 is a detailed illustration depicting how the distributed authentication object arbitrates authentication transactions involving a client, web agent, and authentication service, in accordance with one exemplary embodiment of the present invention. As shown in this embodiment, the distributed authentication object 110, web agent 112, and protected network resource 120 resides within a DMZ layer 204 that is protected by a first security layer 106 (i.e., firewall). It should be appreciated that the protected network resource 120 can reside behind any security layer so long as the web agent 112 can be configured to protect the resource 120 from unauthorized access by a client 102.

The authentication service 118 resides within a secure server layer 205 that is protected by a second security layer 114, which is behind the first security layer 106. The client 102 resides outside both the first security layer 106 and the second security layer 114. The web agent 112 is deployed within a web container 208B, while the distributed authentication object 110 includes a distributed authentication module 230 which is also deployed within a web container 208A. The distributed authentication object 110 is configured to be coupled to the client 102, web agent 112, and authentication service 118 via a series of internal (i.e., internal software logic) and external (i.e., LAN, Internet, etc.) communications links.

Still with FIG. 2, in one embodiment, the authentication service 118 includes an access policy 224 that defines client 102 access permissions to a protected network resource 120 when the client 102 makes a request to access the protected network resource 120. The access policy 224 provides the basis for the authentication operations by delineating the authentication conditions (e.g., Unix 228, Certificate, etc.) 218 that must be satisfied in order for a subject (i.e., USER, client, etc.) 222 to be authenticated and given access to the protected network resource 120. The authentication conditions 218 are set in modular form (i.e., authentication modules) that can be added or subtracted from the access policy 224 as needed by an administrator of the authentication service 118.

Typically, the authentication modules authenticate based on client credentials (i.e., information provided by the client) relating to a distinguishing characteristic of the authorized client (e.g., biometric information, device configuration, etc.), something that only the authorized client possesses (e.g., Smartcard, security token, software token, etc.), something that only the authorized client knows (e.g., a password, a pass phrase, personal identification number, keystroke sequence, etc.), or some combination of the three. It should be understood that the examples of client credentials depicted herein are used for illustration purposes only and are not meant to limit the types of information that the client credentials may be based on.

Continuing with FIG. 2, in one embodiment, the authentication conditions 218 calls for the USER (i.e., subject 222) to be successfully authenticated by both a Lightweight Directory Access Protocol (LDAP) 220 authentication module and a Unix 228 authentication module. The USER will not be given access to the protected network resource 120 unless the USER is successfully authenticated by both authentication modules (i.e., LDAP 220 and Unix 228). It should be appreciated that the authentication module types depicted in this embodiment are used for illustration purposes only and are not meant to limit the makes or types of authentication modules that can be used by this invention. Examples of other types of authentication modules include, HTTP Basic, Radius, SAFEWORD™, SecureID, Certificate-based, Microsoft NT™, and Anonymous. One skilled in the art will understand that the authentication conditions 218 can essentially include any type or make of authentication module so long as the module can be configured to operatively function within the framework of the access policy 224.

In one embodiment, the client 102 is operatively coupled to the distributed authentication object 110 via an Internet connection. In another embodiment, the client 102 is operatively coupled to the distributed authentication object 110 via a LAN connection. The coupling allows both a credential extraction 202 operation and a credential requirements presentation 201 operation to be transacted between the distributed authentication object 110 and the client 102. In one embodiment, the client 102 is operatively coupled (i.e., via a LAN or WAN connection) to the web agent 112 enabling requests for access to a protected network resource 120 to be made by the client 102. In another embodiment, the distributed authentication object 110 is operatively coupled to the authentication service 118 via a communications backchannel 216. As previously described, in one embodiment, the communications backchannel 216 is designed to allow only communications originating from certain designated objects (i.e., distributed authentication object 110) or devices (i.e., distributed authentication server) in the system to communicate with the authentication service 118.

Still with FIG. 2, clients 102 request access to the protected network resource 120 by sending a request to a web agent 112 designated to protect the protected network resource 120. The web agent 112 is configured to parse the request to determine whether the request includes a required authentication token (e.g., SSO token, etc.) signifying that the client 102 is authorized to access the protected network resource 120. If the web agent 112 determines that the request contains the required authentication token, the client 102 will immediately be allowed to access to the protected network resource 120 without further authentication steps taken. If the web agent 112 determines that the request does not include the required authentication token, the web agent 112 will re-direct the request to the distributed authentication object 110 to arbitrate further authentication transactions between the client and the authentication service 118.

In one embodiment, the distributed authentication object 110 is configured to translate the access request re-directed from the web agent 112 into a client credentials requirement (i.e., authentication solution) input call that is communicated via a backchannel 216 to the authentication service 118. The input call essentially asks the authentication service 118 to provide guidance (i.e., input) specifying what client credentials are required from the client 102 before the client 102 will be allowed to access the protected network resource 120. As discussed above, within the authentication service 118, the access policy 224 delineates the authentication conditions (e.g., LDAP 220, Unix 228, Certificates, etc.) 218 that must be satisfied in order for a subject (i.e., user, client, etc.) 222 to be authenticated and given access to the protected network resource 120. The authentication service 118 utilizes the access policy 224 to provide input as to what the client credentials requirement is and communicates the input to the distributed authentication object 110, which then uses the information to generate a credential requirements presentation page 201 that is sent to the client 102. In one embodiment, the input includes information relating to the presentation framework and callbacks for the distributed authentication object 110 to use in the credential requirements presentation page 201. In one embodiment, the presentation framework is based on J2EE™ Assisted Take Off (JATO).

After viewing the credential requirements presentation page 201, the client 102 can then reply with the client credentials requirement (i.e., authentication solution), in a credentials extraction operation 202, to the distributed authentication object 110 which in turn relays the reply to the authentication service 118. The authentication service 118 is configured to examine the reply to determine if the client credentials requirement has been provided by the client 102. If the client credentials requirement has been provided by the client 102, the authentication service 118 passes back an authentication token to the distributed authentication object 110. The distributed authentication object 110 then re-directs the authentication token and the client 102 to the protected network resource 120 enabling the client 102 to access the protected network resource 120. In one embodiment, if the client credentials requirement has not been provided by the client 102, the authentication service 118 passes back an appropriate error message indicating why the client credentials requirement provided by the client 102 failed. In another embodiment, if the client credentials requirement has not been provided by the client 102, the authentication service 118 passes back a message indicating that there was an error during authentication without specifying the reasons for the error.

Remaining with FIG. 2, it should be appreciated that the credential requirements presentation page 201 can be created using any programming language so long as the resulting page can be viewed by the client 102 using a web browser 203 or other equivalent viewing tool. Examples of programming languages that can be used alone or in combination to create the credential requirements presentation 201 page include XML, JAVA™, C, C++, Visual Basic, JAVASCRIPT™, Practical Extraction and Reporting Language (PERL), XML User Interface Language (XUL), HTML, Extensible Hypertext Markup Language (XHTML), and Extensible Bindings Language (XBL). In one embodiment, the credentials requirements presentation page 201 is a client login that is rendered as a graphical user interface (GUI) by the client web browser. The GUI is configured to accept the required client credentials entered by the client 102. In one embodiment, the client login is based on a JAVA™ Authentication and Authorization (JAAS) application programming interface and service provider interface.

Figure 3:
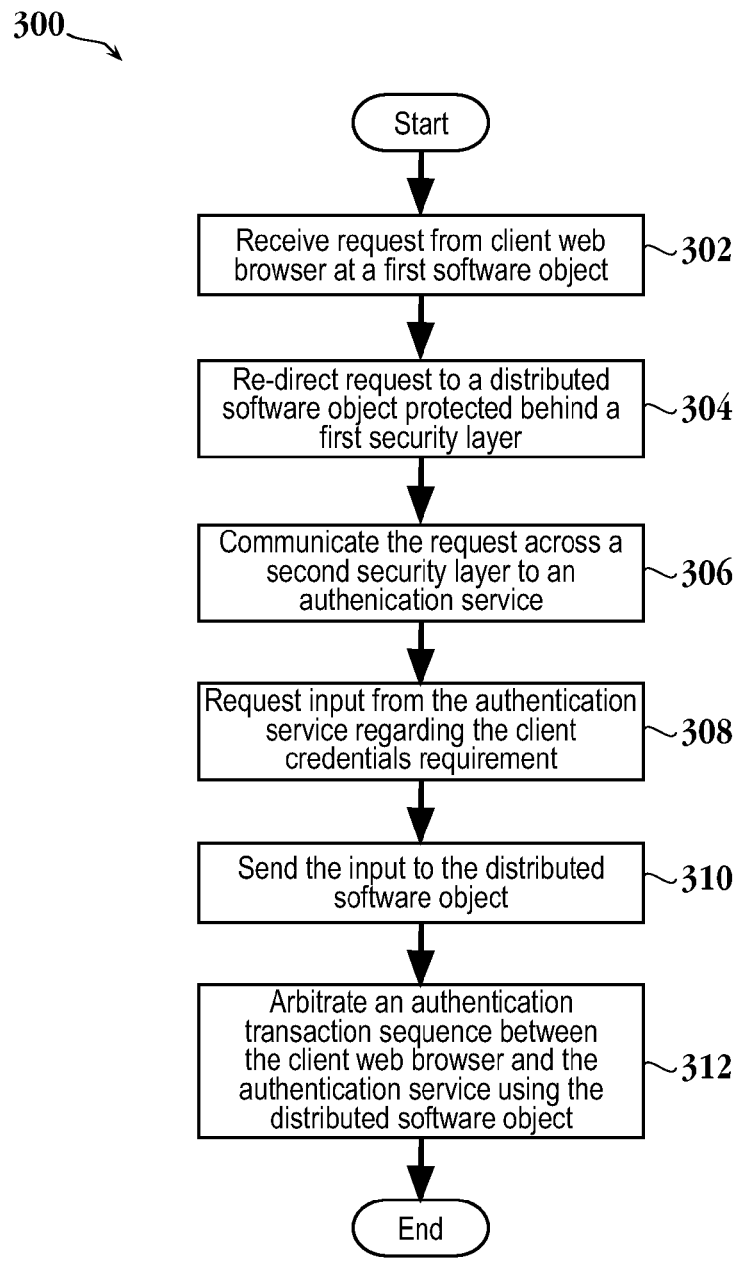
FIG. 3 shows a flow chart for authenticating a request to access a protected network resource, in accordance with one exemplary embodiment of the present invention.

FIG. 3 shows a flow chart for authenticating a request to access a protected network resource, in accordance with one exemplary embodiment of the present invention. Diagrams of the distributed authentication system utilized in this method are shown in FIGS. 1A, 1B, and 2. Method 300 starts with operation 302 where the first software object receives a request from a client web browser to access a protected network resource. In one embodiment, the first software object is a web agent. In another embodiment, the first software object is a web application. The method 300 then proceeds to operation 304 where the request is re-directed to a distributed software object protected behind a first security layer. As discussed above, this re-direct occurs only if the client request is not accompanied by a required authentication token. It should be appreciated that first security layer can be either a software based or device based firewall.

The method 300 then goes to operation 306 where the distributed software object communicates the client request across a second security layer to an authentication service. Referencing the descriptions provided previously, the authentication service can reside on either the same server or a different server than the distributed software object depending on the system design. Additionally, the second security layer can be either a software based or device based firewall.

Continuing with FIG. 3, the method 300 goes to operation 308 whereby the client request solicits input from the authentication service regarding the client credentials requirement (i.e., authentication solution) needed from the client in order for the client to be given access to the protected network resource. As discussed above, the client credentials requirement typically relates to a distinguishing characteristic of the authorized client (e.g., biometric information, device configuration, etc.), something that only the authorized client possesses (e.g., Smartcard, security token, software token, etc.), something that only the client knows (e.g., a password, a pass phrase, personal identification number, keystroke sequence, etc.), or some combination of the three.

After the authentication service receives the solicitation for input, the method 300 moves on to operation 310 where the authentication service sends input specifying the client credentials requirement to the distributed software object. As discussed previously, in one embodiment, the input includes the client credentials requirement and information relating to the presentation framework, and callbacks for the distributed software object to use during the credentials extraction operation with the client.

Next, the method 300 moves to operation 312 where the distributed software object arbitrates an authentication transaction sequence between the client web browser and the authentication service using the distributed software object. In one embodiment, the authentication transaction sequence involves the distributed software object translating the input into a credentials requirements presentation page and relaying the page to the client web browser. After the client sends a response with the client credentials requirement (i.e., authentication solution) to the distributed software object, the response is relayed to the authentication service for authentication. As described above, if the authentication is successful an authentication token (e.g., SSO token, etc.) is issued by the authentication service to allow the client to access the protected network resource. If not, an error message is generated by the authentication service and sent to the distributed software object for relay to the client web browser.

Figure 4:
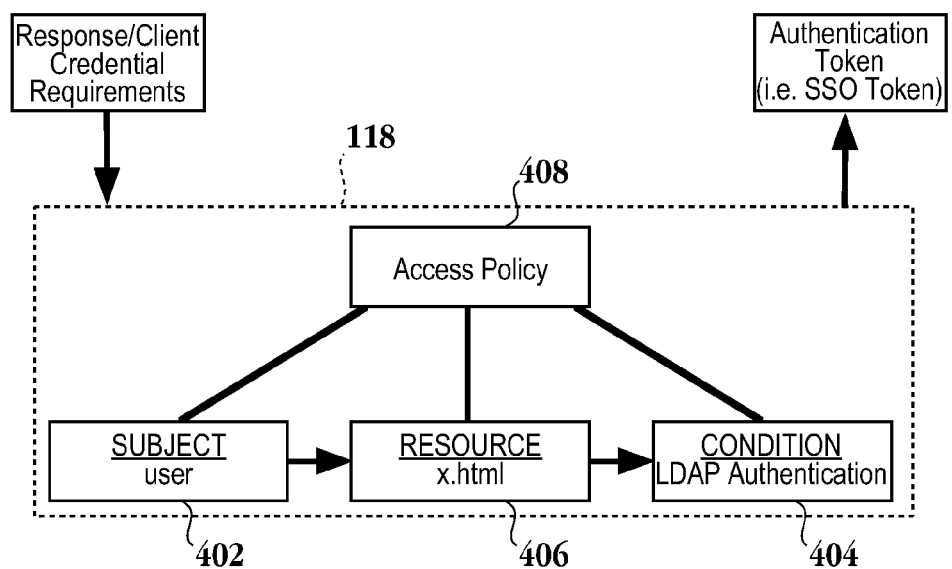
FIG. 4 provides a detailed illustration of how the authentication service functions during the process of authenticating a client, in accordance with one exemplary embodiment of the present invention.

FIG. 4 provides a detailed illustration of how the authentication service functions during the process of authenticating a client, in accordance with one exemplary embodiment of the present invention. As depicted in this embodiment, once the authentication service 118 receives a response (i.e., client request to access a protected resource 406) from the distributed authentication object with the client credentials requirement (i.e., authentication solution), the response is parsed and examined. As discussed above, the authentication service 118 authenticates response based on an access policy 408 set for a protected resource 406. For example, in this embodiment, the access policy 408 delineates the authentication condition (i.e., LDAP Authentication) 404 that must be satisfied in order for a subject (i.e., USER) 402 to be authenticated and given access to the protected resource (i.e., x.html) 406. It should be appreciated that the authentication condition depicted herein is used for illustration purposes only and is not meant limit the number or types of authentication conditions that can be utilized by the present invention. One skilled in the art will know that an access policy 408 can include a greater or lesser number of authentication conditions depending on the particular authentication application.

Using the example depicted for this embodiment, the client response is first examined to determine whom or what the subject 402 is and which protected resource 406 the subject 402 is requesting to access. In this example, the subject 402 is a "USER" and the protected resource 406 is the "x.html" web page. Next, the authentication service 118 looks to the required condition(s) 404 that must be satisfied in order for the USER to gain access to the x.html page. In this example, the condition 404 is that the USER must be authenticated against a LDAP directory resource that is linked to the authentication service 118. If the client response successfully traverses the authentication service 118 examination, the authentication service 118 issues an authentication token (i.e., SSO token). In one embodiment, if the client response does not successfully traverse the authentication service 118 examination, an error message is generated indicating which part of the authentication examination the client response failed. In another embodiment, if the client response does not successfully traverse the authentication service 118 examination, an error message is generated without specifying the reasons for the failure.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include hard drives, electromagnetic wave carrier, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although a few embodiments of the present invention have been described in detail herein, it should be understood, by those of ordinary skill, that the present invention may be embodied in many other specific forms without departing from the spirit or scope of the invention. Therefore, the present examples and embodiments are to be considered as illustrative and not restrictive, and the invention is not to be limited to the details provided therein, but may be modified and practiced within the scope of the appended claims.

What is claimed is:

1. A computer implemented method for authenticating a request to access a protected network resource, comprising:
   receiving the request to access the protected network resource at a first software object, the request originating from a web browser;
   permitting access to the protected network resource by the first software object, if the request includes a required authentication token to access the protected network resource;
   re-directing the request to a distributed software object by the first software object, if the request does not include the required authentication token to access the protected network resource, the distributed software object being protected by a first security layer;
   translating the re-directed request into a client credentials requirement input call for an authentication service, by the distributed software object;
   communicating the client credentials requirement input call by the distributed software object across a second security layer to the authentication service using a backchannel that only allows communication through the distributed software object, the first software object being prevented from accessing the authentication service, the authentication service being protected by the second security layer, the second security layer being behind the first security layer, wherein the authentication service resides in a distinct space that is separate from the space where the first software object, the distributed software object and the protected network resource reside;
   requesting input from the authentication service specifying a required authentication solution by the distributed software object based on the client credentials requirement input call;
   receiving the input from the authentication service to the distributed software object; and
   arbitrating an authentication transaction sequence between the web browser and the authentication service based upon the received input, wherein arbitration between the web browser and the authentication service is only through the distributed software object without utilizing the first software object, wherein the arbitration includes,
   receiving a response with the required authentication solution by the distributed software object using the web browser, the response enabling issuance of a new authentication token by the authentication service to the distributed software object so as to allow the distributed software object to re-direct the web browser to the first software object for accessing the protected network resource.

2. The method for authenticating a request to access a protected network resource, as recited in claim 1, wherein: the authentication transaction sequence includes,
   relaying the input to the web browser by the distributed software object;
   receiving the response with an authentication solution by the distributed software object using the web browser;
   relaying the response to the authentication service by the distributed software object;
   determining if the authentication solution has been provided through the authentication service is the required authentication solution; and
   issuing the new authentication token by the authentication service to the distributed software object if the required authentication solution is provided in the response, the distributed software object re-directing the web browser to the first software object, the new authentication token enabling the web browser to access the protected network resource through the first software object.

3. The method for authenticating a request to access a protected network resource, as recited in claim 1, wherein the first software object is one of a web agent or web application configured to restrict access to the protected network resource.

4. The method for authenticating a request to access a protected network resource, as recited in claim 1, wherein each of the first security layer and the second security layer is one of a device-based firewall or a software-based firewall.

5. The method for authenticating a request to access a protected network resource, as recited in claim 1, wherein the authentication solution is selected from the group consisting of a personal identification number, a password, a keystroke sequence, biometric data, an Smartcard, or a security token.

6. The method for authenticating a request to access a protected network resource, as recited in claim 2, further comprising:
   sending an error message to the distributed software object if the required authentication solution is not provided in the response; and
   relaying the error message to the web browser by the distributed software object.

7. A computer system for implementing authentication of a request to access a protected network resource behind two security layers, comprising:
   an authentication server, the authentication server hosting a first software object and a second software object, the first software object and the second software object capable of being executed by a microprocessor, the first software object and the second software object being protected by a first security layer, the first software object including a web agent residing within a first web container, the web agent configured to provide access to the protected network resource if the request includes a required authentication token and to communicate with the second software object if the request does not include the required authentication token to access the protected network resource, the second software object including a distributed authentication module residing within a second web container, the distributed authentication module configured to,
   translate the request into a client credentials requirement input call for an authentication service;
   communicate the client credentials requirement input call to the authentication service using a backchannel that only allows communication through the distributed authentication module, the web agent being prevented from accessing the authentication service;
   request input from the authentication service specifying a required authentication solution based on the client credentials requirement input call; and arbitrate authentication transactions between a web browser requesting the protected network resource outside the two security layers and the authentication service, the authentication service being protected by a second security layer, the second security layer being behind the first security layer, wherein the authentication service resides in a distinct space that is separate from the space where the first software object, the second software object and the protected network resource reside, wherein arbitration between the authentication service and the web browser is provided only through the distributed authentication module without utilizing the web agent, wherein the arbitration includes, receiving a response with the required authentication solution by the second software object using the web browser based on relaying of the input to the web browser by the second software object, the response enabling issuance of a new authentication token by the authentication service to the second software object so as to allow the second software object to re-direct the web browser to the first software object for accessing the protected network resource.

8. The system for authenticating a request to access a protected network resource behind two security layers, as recited in claim 7, wherein each of the first security layer and the second security layer is one of a device-based firewall or software-based firewall.

9. The system for authenticating a request to access a protected network resource behind two security layers, as recited in claim 7, wherein the authentication service is hosted on an identity server.

10. The system for authenticating a request to access a protected network resource behind two security layers, as recited in claim 7, wherein the distributed authentication module is configured to intercept all authentication transactions between the web browser and the authentication service.

11. The system for authenticating a request to access a protected network resource behind two security layers, as recited in claim 7, wherein the web agent is configured to determine if the request contains an authentication token, the web agent permitting the web browser to access the protected network resource if the request contains the authentication token and re-directing the request to the distributed authentication module if the request does not contain the authentication token.

12. The system for authenticating a request to access a protected network resource behind two security layers, as recited in claim 7, wherein if the response contains the required authentication solution the authentication service generates the new authentication token, the new authentication token enabling the web browser to access the protected network resource.

13. The system for authenticating a request to access a protected network resource behind two security layers, as recited in claim 12, wherein the required authentication solution is selected from the group consisting of a personal identification number (PIN), a password, a keystroke sequence, biometric data, an identification (ID) card, or a security token.

14. A computer system for implementing authentication of a request to access a protected network resource behind two security layers, comprising:

a client, the client containing a web browser;
a first server tier protected behind a first security layer, the first server tier hosting a first software object and a second software object, the first software object and the second software object capable of being implemented by a microprocessor, the first server tier being operatively coupled to the client system via a first connection, wherein the first software object and the second software object are each configured to be in communications with the web browser; and
a second server tier protected behind the first security layer and a second security layer, the second server tier hosting an authentication service, wherein the authentication service resides in a distinct space that is separate from the space where the first software object, the second software object and the protected network resource reside, the second server tier being operatively coupled to the first server tier via a second connection, wherein the authentication service is configured to be in communications with the second software object,
wherein the first software object is configured to provide access to the protected network resource if the request includes a required authentication token and to communicate with the second software object if the request does not include the required authentication token to access the protected network resource and wherein the second software object is configured to,
translate the request into a client credentials requirement input call for an authentication service;
communicate the client credentials requirement input call to the authentication service using a backchannel that only allows communication through the distributed software object in the first server tier, the first software object being prevented from accessing the authentication service;
request input from the authentication service specifying a required authentication solution based on the client credentials requirement input call; and
arbitrate authentication transactions between a web browser requesting the protected network resource outside the two security layers and the authentication service, wherein arbitration between the web browser and the authentication service is provided only through the distributed authentication module without utilizing the first software object, wherein the arbitration includes,
receiving a response with the required authentication solution by the distributed software object using the web browser, the response enabling issuance of a new authentication token by the authentication service to the distributed software object so as to allow the distributed software object to re-direct the web browser to the first software object for accessing the protected network resource.

15. The system for authenticating a request to access a protected network resource behind two security layers, as recited in claim 14, wherein the first server tier and the second server tier are integrated into a single authentication server.

16. The system for authenticating a request to access a protected network resource behind two security layers, as recited in claim 14, wherein the first software object is hosted by a first authentication server and the second software object is hosted by a second authentication server.

17. The system for authenticating a request to access a protected network resource behind two security layers, as recited in claim 14, wherein the first software object is a web agent restricting access to the protected network resource.

18. The system for authenticating a request to access a protected network resource behind two security layers, as recited in claim 14, wherein the second software object is a distributed authentication object, the distributed authentication object being configured to intercept and arbitrate all authentication transactions between the web browser and the authentication service.

19. The system for authenticating a request to access a protected network resource behind two security layers, as recited in claim 16, wherein each of the first security layer and the second security layer is one of a device-based firewall or a software-based firewall.

20. The system for authenticating a request to access a protected network resource behind two security layers, as recited in claim 14, wherein the second connection is a backchannel connection, the backchannel connection being configured to solely permit communication transactions between the distributed authentication object and the authentication service.

* * * * *